United States Patent
Rackett

(10) Patent No.: US 6,282,322 B1
(45) Date of Patent: Aug. 28, 2001

(54) SYSTEM AND METHOD FOR COMPRESSING AND DECOMPRESSING IMAGES

(75) Inventor: Albert E. Rackett, Milpitas, CA (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/207,835

(22) Filed: Dec. 3, 1998

(51) Int. Cl.$^7$ ........................................ G06K 9/36
(52) U.S. Cl. ................. 382/248; 382/251; 375/240.24
(58) Field of Search .............................. 382/232, 233, 382/238, 248, 250, 251; 348/400.1, 411.1, 693, 409.1; 375/240, 240.01, 240.24, 240.25

(56) References Cited

U.S. PATENT DOCUMENTS

| | | |
|---|---|---|
| 5,001,559 | 3/1991 | Gonzales et al. . |
| 5,243,428 * | 9/1993 | Challapali et al. ................. 358/167 |
| 5,912,707 * | 6/1999 | Kim .................................... 348/699 |
| 6,005,622 * | 12/1999 | Haskell et al. ..................... 348/400.1 |
| 6,028,637 * | 2/2000 | Sugiyama ............................. 348/411 |

OTHER PUBLICATIONS

Cham W.K. et al: "Low Frequency Coefficient Prediction for Image Coding", Proceedings of ICICS, 1997 Int'l Conf. on Information, Communications and Signal Processing. Theme: Trends In Information Systems Engineering and Wireless Multimedia Communications (Cat. No. 97$^{th}$8237), Proceedings of 1$^{st}$ Int'l Con, pp. 1580–1584, vol. 3 XP002132017, 1997, New York, NY USA, IEEE USA ISBN: 0-7803-3676-3.

Cham W.K. et al: "Restoration of Low Requency Coefficients" ICSP '96 1996 3$^{rd}$ Int'l Conf. on Signal Processing Proceedings (CAT. No. 96$^{th}$8116), Proceedings of Third Int'l C onf. on Signal Processing (ICSP'96), Beijing, China, 14–18, Oct. 1996, pp. 1082–1085, vol. 2, XP002132018 1996, New York, NY USA, IEEE, USA ISBN: 0-7803-1912-0.

JPEG Still Image Compress, by Pennebaker et al., 1993, Van Nostrand Reinhard, Chap. 16.

"Improved Image Reproduction from DC Components", Opt. Eng. 35(12) pp. 3449–3452, Dec. 1996.

"Blocking Artifacts Reduction in Image Coding Based on Minimum Block Boundary Discontinuity" by Byeungwoo Jeon et al. In 198/SPIE vol. 2501 pp. 198–209.

* cited by examiner

Primary Examiner—Jon Chang
Assistant Examiner—Jingge Wu
(74) Attorney, Agent, or Firm—Russell Gross

(57) ABSTRACT

This invention relates to systems and methods for increasing image compression. The systems and methods are improvements applicable to encoder/decoders which compress images by, inter alia, transforming non-overlapping independent blocks of pixels into a frequency domain and then quantizing the resulting frequency domain coefficients. The invention achieves increased compression by predicting low frequency coefficients of a block from, preferably, the average intensities, or zero frequency coefficients, of the block and its adjacent blocks. In an encoder, the low frequency coefficients are predicted, are then subtracted from the actual transform coefficients, and the difference coefficients are transmitted to a decoder. In the decoder, the low frequency coefficients are again predicted, are added to the received difference coefficients, and the resulting actual transform coefficients are used to reconstruct an image.

4 Claims, 6 Drawing Sheets

SYSTEM AND METHOD FOR COMPRESSING AND DECOMPRESSING IMAGES

BACKGROUND OF THE INVENTION

1. Field of the Invention

The present invention relates to systems and methods for increasing compression of data streams containing image data, and in particular to systems and methods that increase compression by predicting values for certain low frequency coefficients of pixel block transforms.

2. Description of the Related Art

Many important image compression methods process images as independent blocks of pixels. For example, such families of compression standards as JPEG, MPEG, H.320, and so forth, specify a step involving discrete cosine transformation ("DCT") of independent, non-overlapping 8×8 blocks of pixels in the source image followed by quantization of the resulting transform coefficients. See, e.g., Jack, 1996, *Video Demystified,* HighText Interactive Inc., San Diego, Calif. The quantized transform coefficients are transmitted from a transmitter-encoder to a receiver-decoder.

Such transformation and quantization together achieve compression by exploiting the significant regularities and correlations that typically occur between the values of pixels in 8×8 blocks. However, such methods ignore any regularities and correlations that may occur between pixels in different pixel blocks which are treated as independent by these methods.

Certain work has been reported which attempts to recognize image regularities at scales of a pixel block or larger. Exemplary of these are Pennebaker et al., 1993, *JPEG Still Image Compression,* Van Nostrand Reinhard, chap. 16, which discloses fitting quadratic surfaces to the average values of pixels (equivalent to the "DC", or lowest order, transform coefficient) in adjacent blocks, a computationally complex process; Lakhani, 1996, "Improved Image Reproduction from DC Components", Opt. Eng. 35:3449–2452, which discloses equations for predicting low frequency transform coefficients from DC coefficients that are improved from those in the JPEG standard; and Jeon et al., 1995, Blocking Artifacts Reduction in Image Coding Based on Minimum Block Boundary Discontinuity, Proc SPIE 2501:189–209, which discloses a complex and computationally expensive iterative method for interpolating pixels in order to zero block boundary discontinuities.

This reported work suffers from one or more problems, such as not being directed to maximally improving image compression, ignoring or at best inadequately treating regularities that may exist at scales in an image greater than a pixel block, requiring excessive computational resources, and so forth. What is needed, therefore, is a computationally efficient method and system directed primarily to achieving increased data compression by exploiting additional regularities and correlations in images not exploited by known compression methods and standards.

Citation of a reference herein, or throughout this specification, is not to be construed as an admission that such reference is prior art to the Applicant's invention of the invention subsequently claimed.

SUMMARY OF THE INVENTION

The objects of the present invention are to provide improvements generally applicable to certain types of encoders and decoders for image-containing data of all types which overcome the above identified problems in the current art.

Encoder/decoder pairs to which the present invention is applicable are those that, during image compression transform the image from the spatial domain, where the image is represented as a spatial array of pixels, to a transform domain, where the image is represented as coefficients of the basis functions used in the transform method, followed by quantization of the resulting transform coefficients. During decompression, the decoder reverses these steps. In particular, relevant encoder/decoder pairs divide the spatial domain image into a plurality of non-overlapping sub-blocks of pixels and perform the transformation/inverse transformation independently on each sub-block in the image.

In the relevant types of encoder/decoder pairs, the improvement of the present invention includes, in the encoder, an additional step which predicts certain low-order, or the low-frequency ("LF"), transform coefficients. The predicted LF coefficients are then subtracted from the actual LF transform coefficients to form LF difference coefficients, which are quantized and transmitted to the decoder. In the decoder, these steps are reversed, namely, the LF coefficients are again predicted, and the predicted coefficients are added to the transmitted quantized LF difference coefficients to arrive at the original LF coefficients, up to quantization errors.

The LF coefficient prediction according to the present invention is based on the fact that image-data compression, in addition to that already realized by sub-block transformation and quantization, can be achieved by capturing regularities and correlations between pixel values present in adjacent sub-blocks ("inter-block regularities"). These inter-block regularities can be advantageously exploited by predicting LF transform coefficients to be those that are necessary to smooth differences between adjacent sub-blocks so that the image is smooth at sub-block boundaries. In a preferred embodiment, the differences between adjacent sub-blocks are represented by differences in the average intensities of the adjacent sub-blocks.

In detail, these objects are achieved by the following embodiments of the present invention. In a first embodiment, the present invention includes a method for compressing an image presented as image data in the form of a pixel array comprising: transforming a plurality of pixel blocks to transform coefficients in a frequency domain, wherein the pixel blocks are rectangular, non-overlapping, and the plurality of pixel blocks covers the pixel array, and wherein the transform coefficients represent each pixel block and include a zero frequency transform coefficient, one or more selected low frequency transform coefficients, and remaining transform coefficients, predicting for each pixel block the selected low frequency transform coefficients from a linear combination of the zero frequency transform coefficient of the pixel block and of the zero frequency transform coefficients of pixel blocks orthogonally adjacent to the pixel block, subtracting for each pixel block the predicted selected low frequency transform coefficients from the selected low frequency transform coefficients to form difference transform coefficients, quantizing for each pixel block the difference coefficients and the remaining transform coefficients, and representing the image by compressed image data comprising the zero frequency transform coefficient, the quantized difference coefficients, and the quantized remaining coefficients for each of the plurality of pixel blocks.

In a first aspect of the first embodiment, the step of predicting for each pixel block further comprises: determining an interpolating pixel array having interpolating pixel values linearly interpolating differences between the zero frequency transform coefficient of the pixel block and the zero frequency transform coefficients of pixel blocks orthogonally adjacent to the pixel block, transforming the interpolating pixel array to transform coefficients in the frequency domain, and selecting the predicted selected low frequency transform coefficients as the corresponding transform coefficients of the interpolating pixel array.

In a second aspect of the first embodiment, the step of selecting selects the predicted selected low frequency transform coefficients as those transform coefficients present in an upper left square sub-array of size three-by-three of the transformed interpolating pixel array, excluding the zero frequency transform coefficient of the transformed interpolating pixel array. In a third aspect of the first embodiment, the pixel values of the interpolating pixel array are weighted sums of differences between the zero frequency transform coefficient of the pixel block and the zero frequency transform coefficient of each pixel block orthogonally adjacent to the pixel block, and the pixel values are linearly interpolated in a dimension-independent manner.

In a second embodiment, the present invention includes a computer readable media encoded with program instructions for causing one or more processors to perform the methods and aspects of the methods of the first embodiment.

In a third embodiment, the present invention includes a method for compressing an image presented as image data in the form of an pixel array comprising: transforming a plurality of pixel blocks to transform coefficients in a frequency domain, wherein the pixel blocks are rectangular, non-overlapping, and the plurality of pixel blocks covers the pixel array, and wherein the transform coefficients represent each pixel block and include a zero frequency transform coefficient, one or more selected low frequency transform coefficients, and remaining transform coefficients, predicting for each pixel block the selected low frequency transform coefficients from a linear combination of differences between pixels along the edges of the block and pixels along edges of pixel blocks orthogonally adjacent to the pixel block, subtracting for each pixel block the predicted selected low frequency transform coefficients from the selected low frequency transform coefficients to form difference transform coefficients, quantizing for each pixel block the difference coefficients and the remaining transform coefficients, and representing the image by compressed image data comprising the zero frequency transform coefficient, the quantized difference coefficients, and the quantized remaining coefficients for each of the plurality of pixel blocks.

In a first aspect of the third embodiment, the linear combination of differences comprises a linear combination of averages of all pixels along the edges of the block and averages of all pixels along edges of pixel blocks orthogonally adjacent to the pixel block, In a fourth embodiment, the present invention includes a method for reconstructing an image presented in the form of compressed image data for a plurality of pixel blocks comprising: retrieving the compressed image data, wherein the compressed image data comprise for each pixel block a zero frequency transform coefficient, quantized difference transform coefficients, and quantized remaining transform coefficients, and wherein the pixel blocks are rectangular, non-overlapping, and the plurality of pixel blocks covers a pixel array representing the image, dequantizing the quantized difference transform coefficients and the quantized remaining transform coefficients to provide difference transform coefficients and remaining transform coefficients, respectively, predicting for each pixel block selected low frequency transform coefficients from a linear combination of the zero frequency transform coefficient of the pixel block and of the zero frequency transform coefficients of pixel blocks orthogonally adjacent to the pixel block, adding for each pixel block the predicted selected low frequency transform coefficients to the difference transform coefficients to form selected low frequency transform coefficients, inverse transforming for each pixel block the zero frequency transform coefficient, the selected low frequency transform coefficients, and the remaining transform coefficients, in order that the plurality of pixel blocks is reconstructed, and reconstructing the pixel array from the plurality of reconstructed pixel blocks.

In a first aspect of the fourth embodiment, the step of predicting for each pixel block further comprises: determining an interpolating pixel array having interpolating pixel values linearly interpolating differences between the zero frequency transform coefficient of the pixel block and the zero frequency transform coefficients of pixel blocks orthogonally adjacent to the pixel block, transforming the interpolating pixel array to transform coefficients in the frequency domain, and selecting the predicted selected low frequency transform coefficients as the corresponding transform coefficients of the interpolating pixel array.

In a fifth embodiment, the present invention includes a computer readable media encoded with program instructions for causing one or more processors to perform the methods and the aspects of the methods of the fourth embodiment.

In a sixth embodiment, the present invention includes a system for compressing an image presented as image data in the form of a pixel array comprising: means for transforming a plurality of pixel blocks to transform coefficients in a frequency domain, wherein the pixel blocks are rectangular, non-overlapping, and the plurality of pixel blocks covers the pixel array, and wherein the transform coefficients represent each pixel block and include a zero frequency transform coefficient, one or more selected low frequency transform coefficients, and remaining transform coefficients, means for predicting for each pixel block the selected low frequency transform coefficients from a linear combination of the zero frequency transform coefficient of the pixel block and of the zero frequency transform coefficients of pixel blocks orthogonally adjacent to the pixel block, means for subtracting for each pixel block the predicted selected low frequency transform coefficients from the selected low frequency transform coefficients to form difference transform coefficients, means for quantizing for each pixel block the difference coefficients and the remaining transform coefficients, and means for representing the image by compressed image data comprising the zero frequency transform coefficient, the quantized difference coefficients, and the quantized remaining coefficients for each of the plurality of pixel blocks.

In a seventh embodiment, the present invention includes a system for reconstructing an image presented in the form of compressed image data for a plurality of pixel blocks comprising: means for retrieving the compressed image data, wherein the compressed image data comprise for each pixel block a zero frequency transform coefficient, quantized difference transform coefficients, and quantized remaining transform coefficients, and wherein the pixel blocks are rectangular, non-overlapping, and the plurality of pixel blocks covers a pixel array representing the image, means for dequantizing the quantized difference transform coefficients and the quantized remaining transform coefficients to provide difference transform coefficients and remaining transform coefficients, respectively, means for predicting for each pixel block selected low frequency transform coefficients from a linear combination of the zero frequency transform coefficient of the pixel block and of the zero frequency transform coefficients of pixel blocks orthogonally adjacent to the pixel block, means for adding for each pixel block the predicted selected low frequency transform coefficients to the difference transform coefficients to form selected low frequency transform coefficients, means for inverse transforming for each pixel block the zero frequency transform coefficient, the selected low frequency transform coefficients, and the remaining transform coefficients, in order that the plurality of pixel blocks is reconstructed, and means for reconstructing the pixel array from the plurality of reconstructed pixel blocks.

In an eighth embodiment, the present invention includes a system for compressing an image presented as image data in the form of pixel array data comprising: one or more processors for executing program instructions, and one or more memory units for storing the pixel array to be processed and program instructions, wherein said program instructions cause said one or more processors to transform a plurality of pixel blocks to transform coefficients in a frequency domain, wherein the pixel blocks are rectangular, non-overlapping, and the plurality of pixel blocks covers the pixel array, and wherein the transform coefficients represent each pixel block and include a zero frequency transform coefficient, one or more selected low frequency transform coefficients, and remaining transform coefficients, to predict for each pixel block the selected low frequency transform coefficients from a linear combination of the zero frequency transform coefficient of the pixel block and of the zero frequency transform coefficients of pixel blocks orthogonally adjacent to the pixel block, to subtract for each pixel block the predicted selected low frequency transform coefficients from the selected low frequency transform coefficients to form difference transform coefficients, to quantize for each pixel block the difference coefficients and the remaining transform coefficients, and to represent the image by compressed image data comprising the zero frequency transform coefficient, the quantized difference coefficients, and the quantized remaining coefficients for each of the plurality of pixel blocks.

In a ninth embodiment, the present invention includes a system for reconstructing an image presented in the form of compressed image data for a plurality of pixel blocks comprising: one or more processors for executing program instructions, and one or more memory units for storing the compressed image data to be processed and program instructions, wherein said program instructions cause said one or more processors to retrieve the compressed image data, wherein the compressed image data comprises for each pixel block a zero frequency transform coefficient, quantized difference transform coefficients, and quantized remaining transform coefficients, and wherein the pixel blocks are rectangular, non-overlapping, and the plurality of pixel blocks covers a pixel array representing the image, to dequantize the quantized difference transform coefficients and the quantized remaining transform coefficients to provide difference transform coefficients and remaining transform coefficients, respectively, to predict for each pixel block selected low frequency transform coefficients from a linear combination of the zero frequency transform coefficient of the pixel block and of the zero frequency transform coefficients of pixel blocks orthogonally adjacent to the pixel block, to add for each pixel block the predicted selected low frequency transform coefficients to the difference transform coefficients to form selected low frequency transform coefficients, to inverse transform for each pixel block the zero frequency transform coefficient, the selected low frequency transform coefficients, and the remaining transform coefficients, in order that the plurality of pixel blocks is reconstructed, and to reconstruct the pixel array from the plurality of reconstructed pixel blocks.

BRIEF DESCRIPTION OF THE DRAWING

Other objects, features and advantages of the present invention will become apparent upon perusal of the following detailed description when taken in conjunction with the appended drawing, wherein.

DETAILED DESCRIPTION OF THE PREFERRED EMBODIMENTS

Figure 1:
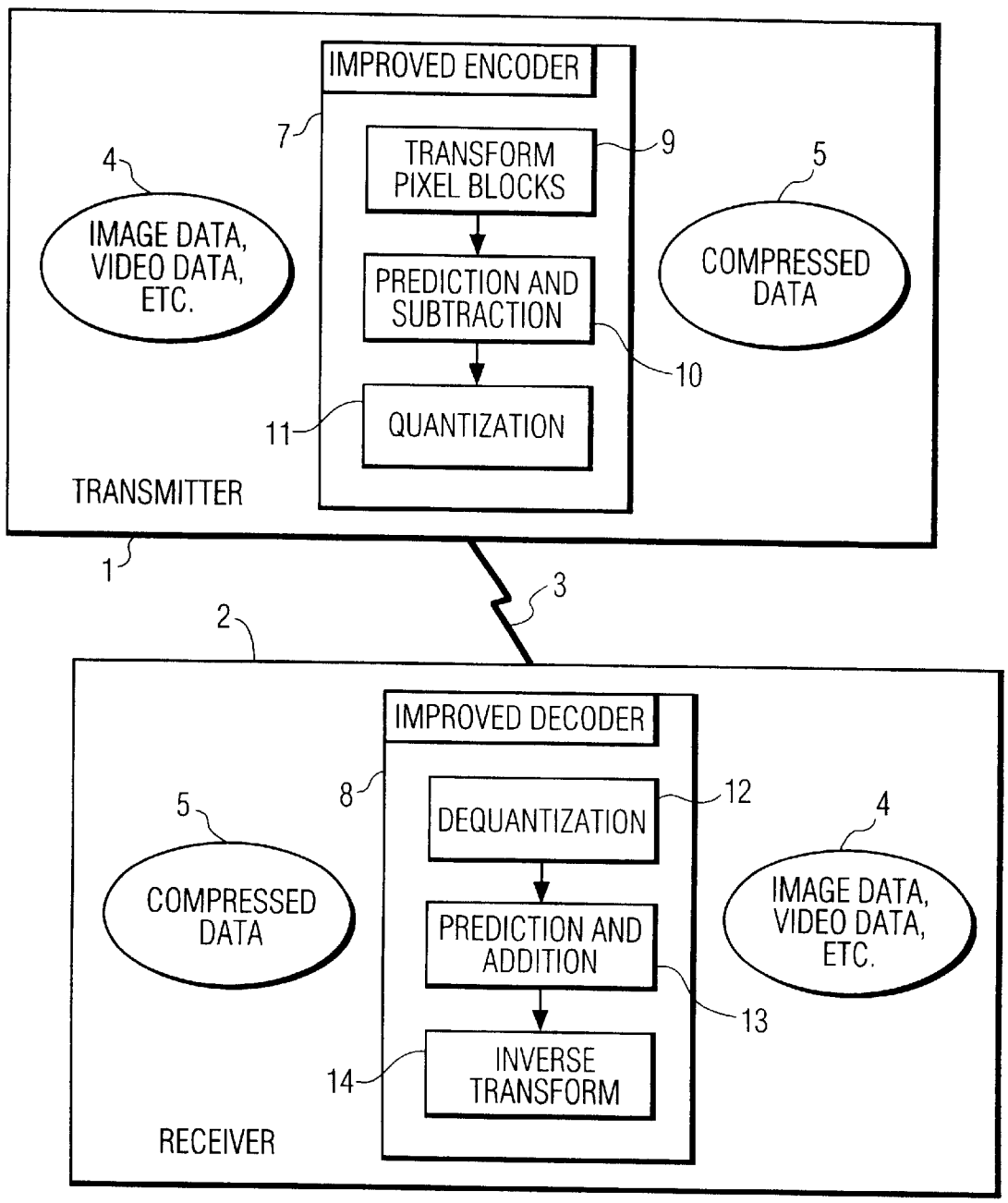
FIG. 1 illustrates encoders and decoders to which the present invention is applicable.

In the following, the system and methods of the present invention are first described generally, followed by detailed descriptions of preferred and alternative embodiments of these systems and methods. Overview of the Present Invention The present invention consists of improvements generally applicable to certain types of encoders and decoders for image-containing data of all types. FIG. 1 illustrates an exemplary practical application of the improved encoders and decoders of the invention, the structure of the encoders and decoders to which the improvements of the invention are applicable, and the general nature of the improvements according to the invention.

In the exemplary application of FIG. 1, transmitter 1 sends image-containing data, such as independent image data or video data 4, to receiver 2 across transmission link 3. Although transmission link 3 is illustrated for concreteness as a communication link, this invention is equally applicable to cases where the transmission is by recording the compressed data on storage media such as magnetic or optical disks. In order to reduce the required bandwidth or the required storage capacity of transmission link 3, transmitter 1 includes improved encoder 7 producing compressed image-containing data 5 which are then sent to receiver 2. Receiver 2 in turn includes a corresponding improved decoder 8 to reconstruct the original image-containing 4 data from compressed data 5. It is to be understood that the applicability of the improved encoders and decoders of the present invention is not limited to such an exemplary application, but comprehends all situations in which image-containing data are to be compressed or decompressed.

With further reference to FIG. 1, encoder/decoder pairs to which the present invention is applicable are those that, during image compression in encoder 7, perform transform 9 of the image from the spatial domain, where the image is represented as a spatial array of pixels, to a transform domain, where the image is represented as coefficients of the basis functions used in the transform method, followed by quantization 11 of the resulting transform coefficients. During decompression, decoder 8 then performs the reverse steps of dequantization 12 of the transform coefficients followed by inverse transform 14 back to a spatial domain pixel data.

In particular, relevant encoder/decoder pairs divide the spatial domain image into a plurality of non-overlapping sub-blocks, or windows, of pixels and perform the transformation/inverse transformation independently on each sub-block, or window, in the image. An image presented as a pixel array is completely divided into the plurality of pixel sub-blocks and can be reconstructed from the plurality of pixel sub-blocks. In the transform, or frequency, domain the image is represented by the transform coefficients, or by their subsequent encoding, for each of the plurality of pixel sub-blocks.

The size and shape of the sub-blocks are carefully chosen so that, on average for the images of interest, pixel values throughout each sub-block are expected to be slowly varying or substantially homogenous. Consequently, on average, the magnitude of the transform coefficients of the sub-blocks decreases rapidly as the spatial frequency of the corresponding transform basis function increases. Thereby, subsequent quantization of the transform coefficients, which replaces the actual value of a coefficient with an indication of in which of a limited number of intervals, which in turn divide the range of possible coefficient values, the actual coefficient value lies, can achieve image-data compression. A judicious choice of the quantization intervals can achieve significant compression without significant loss of perceptual image integrity.

In such encoder/decoder pairs, the improvement of the present invention includes additional step 10 of prediction of the low-order, or the low-frequency ("LF"), transform coefficients, which is performed between transformation step 9 and quantization step 11 in improved encoder 7, and in decoder 8 additional step 13 of prediction performed between dequantization step 12 and inverse transformation step 14. These coefficient prediction steps, steps 10 and 13, increase average compression in the following manner. In an improved encoder, the LF transform coefficients are predicted according to the present invention and then the predicted LF coefficients are subtracted from the actual LF transform coefficients to form LF difference coefficients. This process is reversed in improved decoder 8. In step 13, the LF coefficients are predicted, and the predicted values are added to the transmitted quantized LF difference coefficients to arrive at the original LF coefficients, up to quantization errors.

LF coefficient prediction achieves increased compression because the variable length encoding of the LF difference coefficients is expected to require on average fewer bits than similar encoding of the actual LF coefficients. On average, the predicted LF coefficients are expected to be close to the actual LF coefficients so that the magnitudes of the difference coefficients are expected to be substantially smaller on average than the actual coefficients. Being smaller, the difference coefficients require fewer bits for their variable length encoding.

LF coefficient prediction according to the present invention is based on the following discoveries of the inventor. First, although independent transformation of image sub-blocks achieves image-data compression by capturing significant regularities and correlations between pixel values within image sub-blocks ("intra-block regularities"), further image-data compression can be achieved by capturing regularities and correlations between pixel values present in adjacent sub-blocks ("inter-block regularities"). Second, inter-block regularities can be advantageously exploited by predicting LF transform coefficients to be those that are necessary to smooth differences between adjacent sub-blocks so that the image is smooth at sub-block boundaries. In a preferred embodiment, the differences between adjacent sub-blocks are represented by differences in the average intensities of the adjacent sub-blocks. Since in all relevant transform methods, the average intensity of a sub-block is the same as the zero-frequency ("DC") transform coefficient of that sub-block, this invention, preferably, predicts LF transform coefficients of a sub-block from the DC coefficients of the sub-block and adjacent sub-blocks.

In order to perform LF coefficient prediction at both the encoder and the decoder it is preferred that the DC coefficients be transmitted with minimum or no quantization or discretization error. This is usually the case because accurate DC coefficients are important to maintain perceptual integrity of the image.

Since this invention achieves image-data compression by capturing inter-block regularities in addition to intra-block regularities, it further includes optimizing average compression for a class of images of importance by selecting sub-block size, and optionally sub-block shape, so that the average compression is a maximum. Such a selection can be simply done by measuring average compression for representative images of the class at various sub-block sizes, and then selecting that sub-block size achieving the optimum compression. Typically, allowable sub-block sizes and shapes are limited by the nature of the transform method used and the available computational resources.

The image regularities are correlations, both intra-block and inter-block, exploited by the present invention which are believed by the inventor to arise from the fact that typical images are composed of objects, and that typical objects are composed on average of surfaces having substantially homogenous or only slowly varying intensities. Accordingly, there will be significant intra-block and inter-block regularities and correlation for sub-blocks whose size is selected to be smaller, or significantly smaller, than the average size of object surfaces. Although the present invention is advantageously applicable to increase the compression of data containing such images, it should be understood that this invention can be applied to data containing images of any sort without loss of compression.

Preferably, the present invention is applied to encoder/decoder pairs in which the transform method utilized is a discrete cosine transform ("DCT"), in which the pixel sub-blocks are square arrays of, for example, eight pixels on a side, and in which the DC coefficients are transmitted with minimum or no quantization or discretization error, i.e., without loss. DCT transforms of 8×8 pixel sub-blocks are performed by many current image compression methods, such as the MPEG, JPEG, and H.320 families of standards. Further, these standards typically transmit the DC coefficients in a loss-free manner.

In the case of MPEG encoder/decoder pairs, or in the general case of encoder/decoder pairs performing compression by motion prediction, the present invention is typically applicable only to those images encoded without motion prediction (often referred to as "intra-coded" images, hereinafter "I" type images), because DC coefficients are needed for each image sub-block and for its adjacent sub-blocks at both the encoder and the decoder. Such DC coefficients may not be available for sub-blocks encoded with motion prediction (often referred to as "inter-coded" images, hereinafter "non-I" type images), because such coded frames make reference to preceding or subsequent images. According to the MPEG standards family, non-I type images are either causally predicted ("P" type) from preceding images or bidirectionally-predicted ("B" type) images from both preceding and succeeding images. However, if DC coefficients are available for images encoded with motion-prediction, this invention can be applied to such images as well.

In the following, for concreteness of description and without any limitation, the present invention is described as an improvement to standard MPEG encoders and decoders. From the description above and following, one of skill in art will immediately understand how, according to this invention, to construct improved encoder/decoder pairs employing the JPEG or H.320, as well as the MPEG, standards, as well as to construct improved encoder/decoder pairs employing alternative transformation methods or alternative sizes and shapes for the independent sub-blocks. Further, one of skill in the art will understand how to select basic encoder/decoder parameters, such as pixel sub-block size and shape, in order to achieve increased compression by exploiting regularities present in a class images of interest.

Preferred Systems Embodiments

In this section, the general method implemented in improved encoder/decoder systems according the present invention is described, followed by exemplary improved MPEG encode/decoder systems.

Figure 3A:
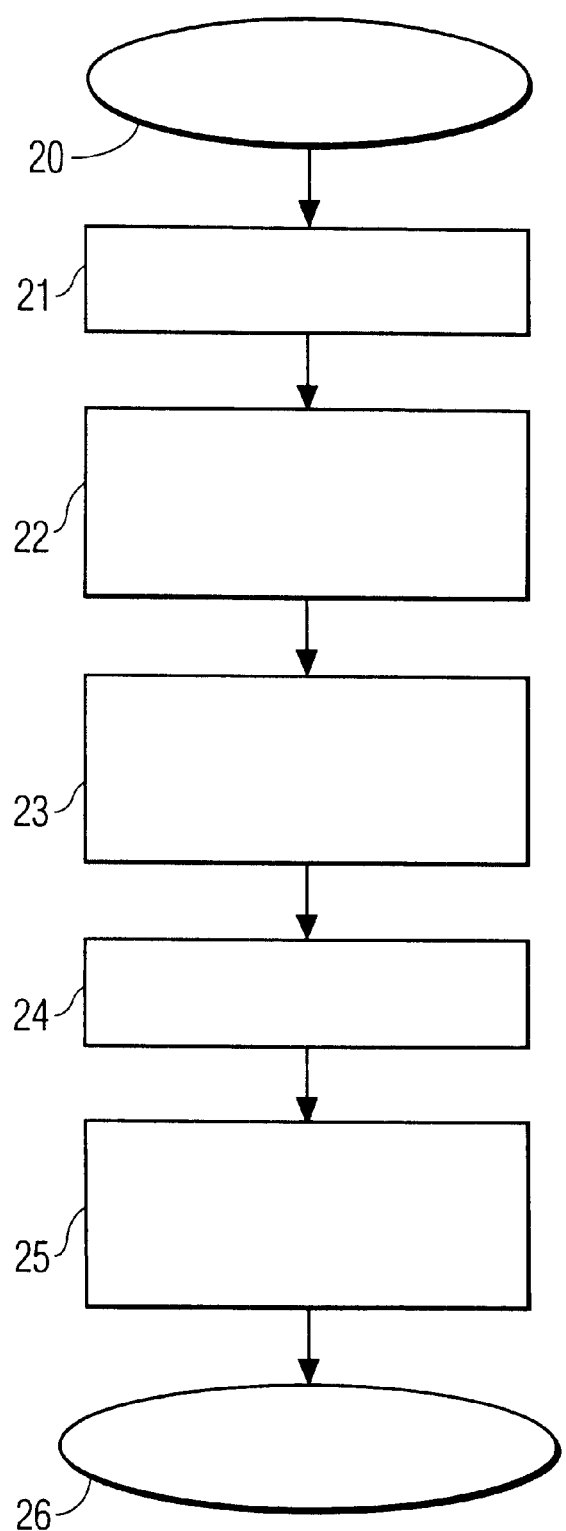
FIGS. 3A–B illustrate methods of the present invention.

FIG. 3A illustrates the general method implemented in the systems of the present invention. According to FIG. 3A and as described above, non-overlapping sub-blocks dividing an image are first transformed to a transform, or frequency, domain, and the resulting transform coefficients are input 20 to the general method of this invention. Preferably, 8×8 pixel sub-blocks are transformed into the frequency domain by a DCT transform. For each sub-block, from its zero-frequency, or DC, transform coefficient, which is known to be proportional to the average pixel intensity in that sub-block, and from the DC coefficients of the adjacent sub-blocks, step 21 predicts selected low-frequency ("LF") transform coefficients of that block. Then, step 22 forms difference coefficients by subtracting the predicted LF coefficients from the corresponding DCT coefficients.

According to the present invention, therefore, the image is encoded and represented by the following data: the DC transform coefficient, the difference transform coefficients, and the remaining transform coefficients, i.e., those transform coefficients other than the LF frequency transform coefficients. One or more the these coefficients can be quantized to achieve data compression. Preferably only the difference and the remaining coefficients are quantized. Although not preferred, the DC coefficient can also be quantized. This representative data can then be used for any purpose.

Coefficient quantization can be performed according to any method known in the art that is adaptable to quantization of transformed pixel blocks. For example, the quantization methods and prescriptions of the JPEG, the MPEG, and the H.320 families of standards can be used.

In particular, step 23 transmits or stores the encoded data representing the image. The DC coefficients are preferably transmitted with minimum or no losses. It is understood that further encoding or compression, such as variable length encoding, Huffman encoding, or so forth, can be performed on these image data prior to final transmission, and that corresponding decoding will then be performed upon reception.

Upon reception or retrieval, step 24 again predicts the LF transform coefficients from the DC coefficients by the same method as their previous prediction. Preferably, the DC coefficients are received without loss, and the previous LF coefficient prediction method is used so that the newly predicted LF coefficients are substantially the same as the originally predicted LF coefficients. In this manner, the error in the reconstructed DC coefficients is limited to quantization errors only of the difference coefficients.

Finally step 25 reconstructs the LF coefficients by adding the predicted LF coefficients to the dequantized, transmitted difference coefficients. Transform coefficients consisting of the DC coefficient, the reconstructed LF coefficients, and the dequantized remaining coefficients, are then output 26.

Figure 2A:
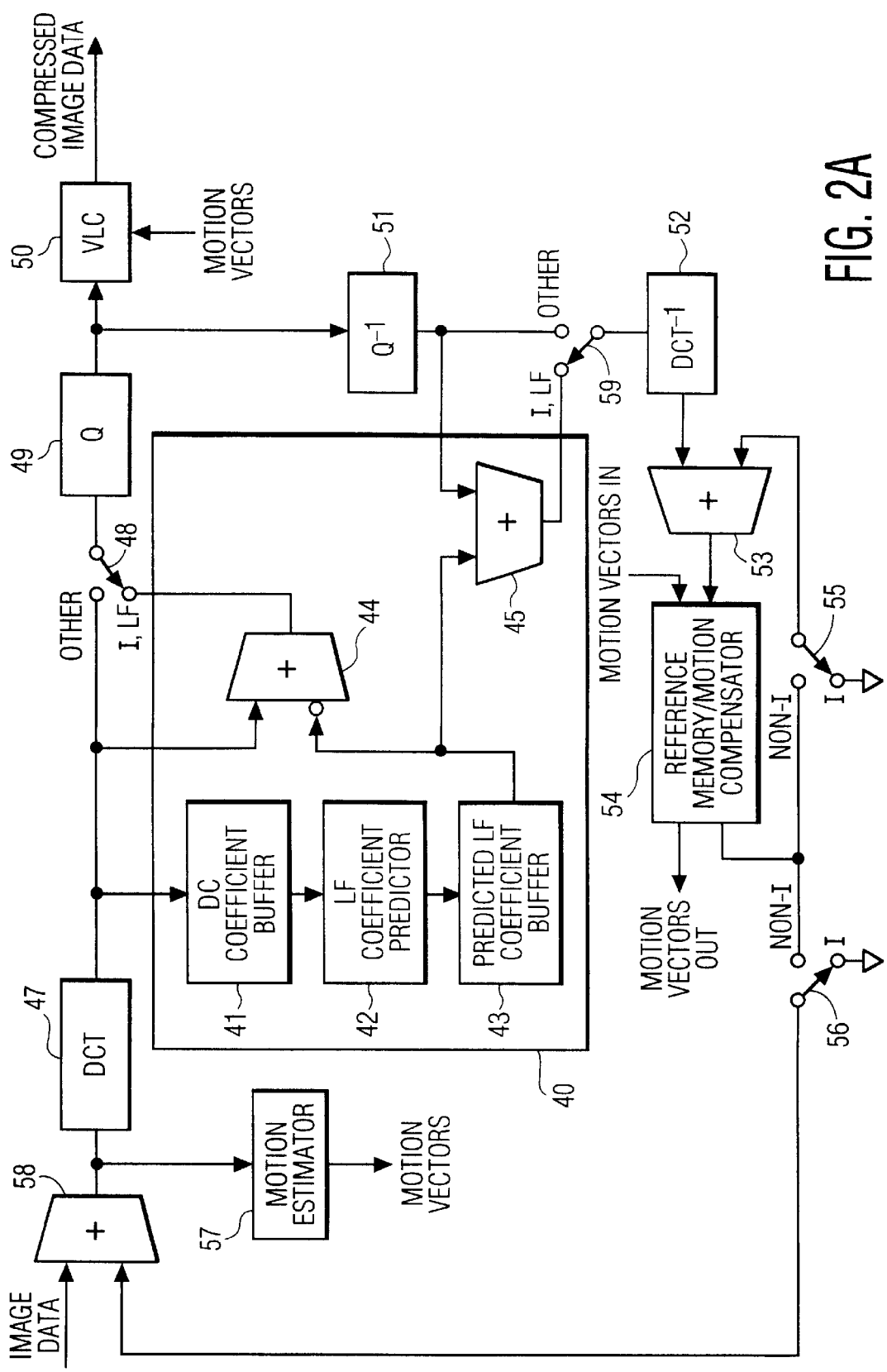
FIGS. 2A–C illustrate exemplary embodiments of systems according to the present invention.
Figure 2B:
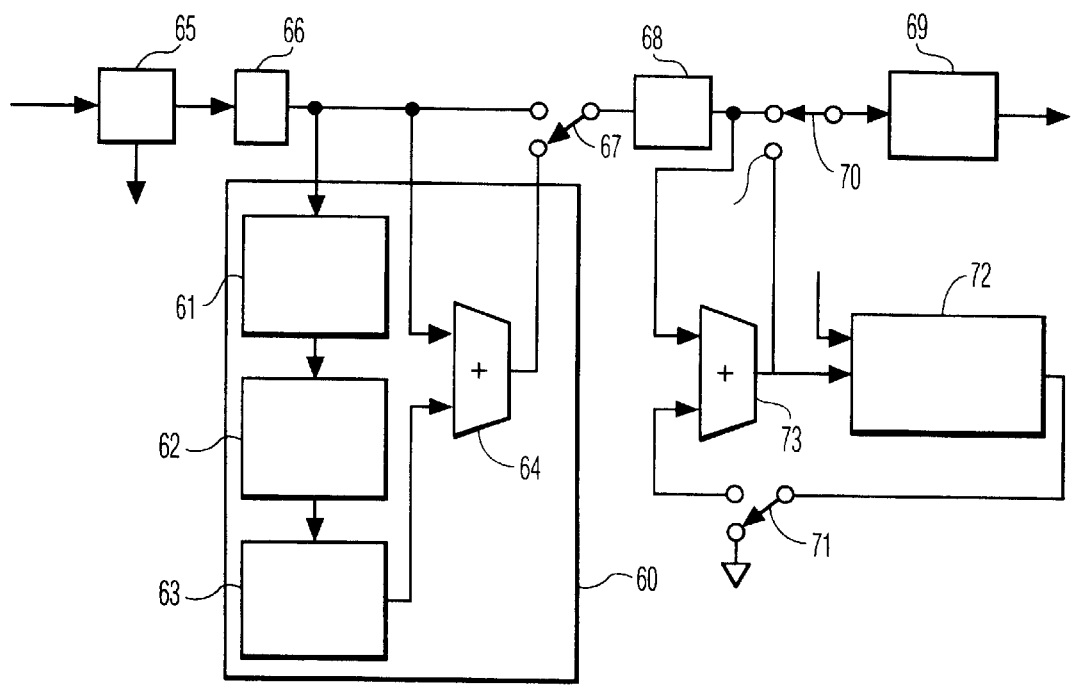

An exemplary embodiment of this general method in improved MPEG encoders and decoders is next presented with reference to FIGS. 2A and 2B illustrating the same. Although this exemplary embodiment is described with respect to a basic MPEG encoder/decoder pair, it will be immediately appreciated by one of skill in the art that other exemplary embodiments can be routinely constructed for encoder/decoder pairs functioning according to any methods or standards that are within the previously described domain of applicability of the present invention.

FIG. 2A schematically illustrates an MPEG encoder improved according to the present invention. FIG. 2B schematically illustrates an improved MPEG decoder. In these figures, elements associated primarily with, inter alia, motion-prediction are only schematically illustrated or are not illustrated, since they are more peripheral to the present invention. In FIGS. 2A–B the elements performing discrete cosine transforms, coefficient quantization, and variable length encoding are standard and well known in the prior art. Their details are not part of the present invention and are not described herein. Further, it will be understood that in the following, whether explicit or not, all operations are performed on individual pixel blocks which cover the image array representation of an image.

Turning now to the details of FIG. 2A, elements 47–50 implement the encoding data path for I-type images; elements 41–45 in box 40 implement the data paths of the improvement of this invention applicable to I-type images; and elements 51–58 implement schematically the motion-prediction data path for encoding P-type and B-type images.

In the case of an I-type image represented as a pixel array in an unimproved MPEG encoder, the image is DCT transformed pixel block by pixel block in element 47 after being passed unchanged through adder 58. Selector 48, set in the "OTHER" position, passes the DCT coefficients to quantizer 49. The quantized DCT coefficients for each pixel block are variable and/or run length ("VLC") encoded in element 50, and are finally output in the compressed image data stream for each pixel block.

In case the improvement of the present invention is present and active, the DC DCT coefficients for each pixel block are stored in DC coefficient buffer 41 so that they are available in the needed order to low-frequency ("LF") coefficient predictor 42. The predicted LF coefficients for each pixel block from predictor 42 are stored in predicted coefficient buffer 43 so that they may be available for subtraction from the corresponding DCT coefficients for each pixel block in adder 44. In this case selector 48 is set to position "I, LF" (denoting LF coefficients of I-type frames), and the difference coefficients are quantized in element 49, variable length encoded in element 50, and then output in the compressed image data stream. For the remaining DCT coefficients for each pixel block, selector 48 is set to the "OTHER" position, and these coefficients are quantized without subtraction.

For motion-prediction, copies of I-type (and certain inter-type) images exactly as they will be decoded in a decoder must be stored in reference memory 64. For other than LF coefficients of I-type images, this is accomplished by simulating image decoding by elements 51 and 52, with element 51 performing dequantization and element 52 performing an inverse DCT. Selector 59 is set to position "OTHER". For LF coefficients of I-type frames, selector 59 is set to position "I, LF" so that predicted LF coefficients, available from buffer 43, are added in adder 45 to dequantized difference coefficients to reconstruct the actual LF coefficients as they will appear in a decoder. In this embodiment it is assumed that the DC coefficients are available with equal accuracy in the decoder and in the encoder.

For P-type or B-type frames, the motion prediction path, elements 51–58 function as is known to those of skill in the art. Briefly, selectors 55 and 56 are set to the "NON-I" position, and reference memory/motion compensator provides motion-predicted frames, using the motion vectors generated by the motion estimation process carried out in element 57, to adder 58 in order to generate images, which are the differences between input and motion-predicted images. These difference images are then DCT transformed in element 47, quantized in element 49, and VLC coded in element 50. Reference memory 54 is updated with I-type and P-type frames as they will appear in a decoder by the addition in adder 53 of inverse transformed difference images to motion compensated stored images. The data representing the image in the improved encoder are then output for all the pixel blocks dividing the image.

FIG. 2B illustrates an MPEG decoder improved according to the present invention. Here, elements 65–70 implement the decoding data path for I-type images; elements 61–64 in box 60 implement the data paths of the improvement of this invention applicable to I-type images; and elements 71–73 implement schematically the motion-prediction data path for decoding P-type and B-type images. For all image types, the compressed image data including quantized transform coefficients (and difference coefficients in the case of the improved encoders/decoders) for each pixel block are first variable-length ("VL") decoded by element 65 and inverse-transformed by element 66.

For I-type images, DC coefficients for each pixel block are stored in buffer 61 in order to be available as necessary to LF coefficient predictor 62. Predicted LF coefficients for each pixel block from predictor 62 are stored in predicted coefficient buffer 63 in order to be available to adder 64 for addition to dequantized LF difference coefficients for each pixel block. For the LF coefficients of I-type images, selector 67 is set to position "I, LF", and for other-than LF coefficients of I-type images, i.e., for the remaining, high frequency coefficients, selector 67 is set to position "OTHER". Actual DCT coefficients for each pixel block are next inverse transformed in element 68, the resulting I-type spatial domain image is reconstructed from the spatial-domain pixel blocks, and the image is directly stored in frame memory 69 and in reference memory 72, since selectors 70 and 71 are set to position "I".

For non-I type images, that is for P-type and B-type images, selectors 67, 70 and 71 are set to the "OTHER" or the "NON-I" position in order that, first, the difference images dequantized by element 66 and inverse transformed by element 68 without addition of predicted LF coefficients. From received motion vectors and images stored in reference memory 72, the motion compensator determines motion-predicted images. The motion-predicted images are added in adder 73 to decoded difference images, and the resulting actual spatial-domain images are stored both in reference memory 72 and frame memory 69. Frame memory 69 stores images for output in correct order in a desired format.

Figure 2C:
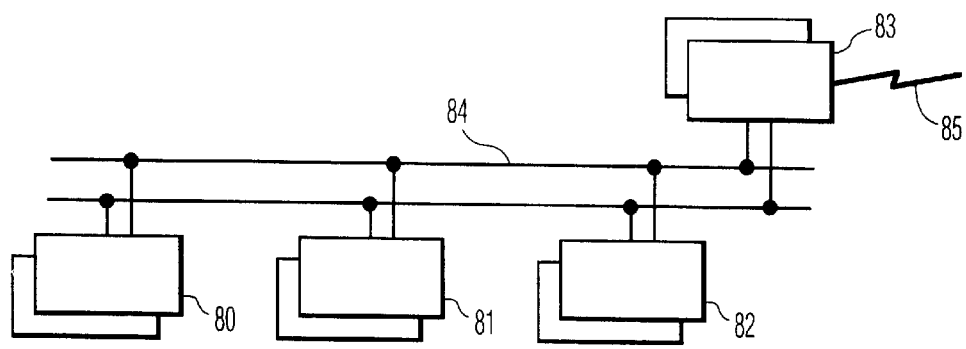

The improved encoders and decoders of this invention can be implemented in various hardware configurations that will be apparent to one of skill in the art. For example, the individual processing elements represented in FIGS. 2A and 2B can be implemented with individually dedicated hardware components. However, it is currently preferable that the processing operations of the system be implemented by one or more special software routines running on general purpose hardware, perhaps optimized for the image processing, such as that illustrated in FIG. 2C. FIG. 2C illustrates one or more processors 80 for encoding and decoding images and performing the operations of the present invention, one or more RAM modules 81 for storing image data and/or program instructions, optionally one or more ROM modules 82 for storing program instructions, one or more I/O interface devices 83 for communicating with other systems over various links 85, and one or more busses 84 for connecting these individual components. Advantageously, the processors include one or more digital signal processors ("DSP"), such as the TM-1000 type DSP (Philips Electronics North America Corp.) or the TMS-3000 type DSP (Texas Instruments, Inc.).

In the preferred embodiment where the system processing operations are implemented in software, the present invention further comprises computer readable media on which are recorded or encoded program instructions for causing processors to perform the processing operation of the system. Such media can include magnetic media, such as floppy discs, hard discs, tapes, and so forth, optical media, such as CD-ROMS, and other computer-readable media available in the art.

Preferred Method Embodiments

This section next describes preferred and alternative embodiments of the prediction methods for the low-frequency ("LF") coefficients for each pixel block dividing the pixel array according to the present invention. These methods implement elements 10 and 13 of FIG. 1, or equivalently element 42 of FIG. 2A and element 62 of FIG. 2B, or equivalently steps 21 and 24 of FIG. 3A for each pixel block. They derive from the discoveries of the inventor that LF coefficients of a pixel block can be simply and effectively predicted as the LF transform coefficients of a spatial-domain pixel array which smoothly interpolates throughout the pixel block the differences occurring across the edges of the block between values of pixels of a block and values of pixels of adjacent blocks ("block-to-block differences"). The interpolating pixel array preferably does not change the average pixel intensity of the block. Since such an interpolating pixel array is likely to be a good representation of the regularities between adjacent pixel blocks occurring in images of objects having surfaces of only slowly varying intensity, its LF transform coefficients are likely to be good predictors of the actual LF transform coefficients.

The block-to-block differences input to determining the interpolating pixel array, and thus to predicting the LF coefficients, are, preferably, approximated from knowledge of the average intensities of the pixel block and its adjacent blocks. Because LF coefficient prediction is done in both encoders and decoders, it is preferably based on data accurately and readily available at both locations. Since most image-compression methods and standards in current use accurately transmit average intensities of pixel blocks as the zero-frequency ("DC") coefficient of that block, LF coefficient prediction is preferably based only on such DC coefficients of a block and its adjacent blocks.

Although less preferable, it is within the scope of the present invention to modify image-compression data streams in order to transmit a limited number of additional items of information in order to enable more accurate LF prediction. Such additional items advantageously represent block-to-block differences with increased accuracy. In one embodiment, they can include averages of the actual differences of edge pixels in one block with edge pixels in adjacent blocks. Whether transmitting such additional items is advantageous in a given case depends on whether the transmission cost of the additional items is recovered from the increased compression resulting from more accurate LF coefficient prediction. Such alternatives are described in detail at the end of the present section.

Figure 3B:
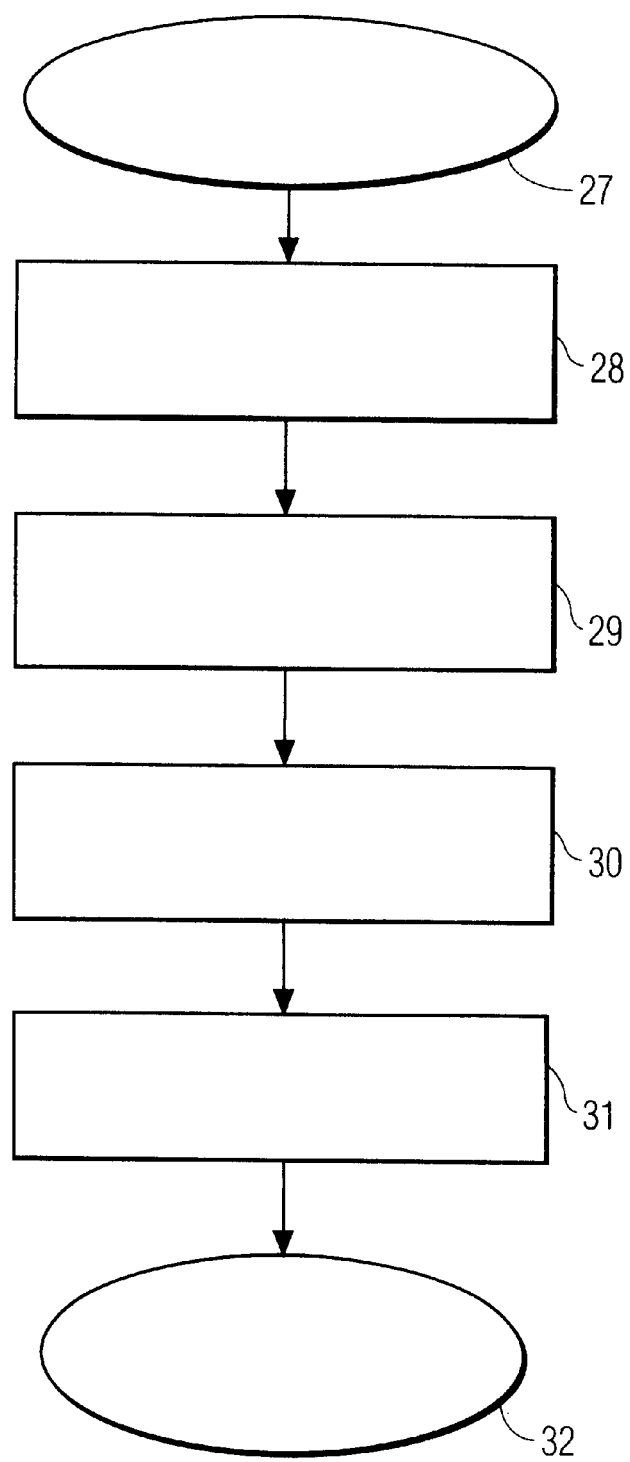
Figure 4A:
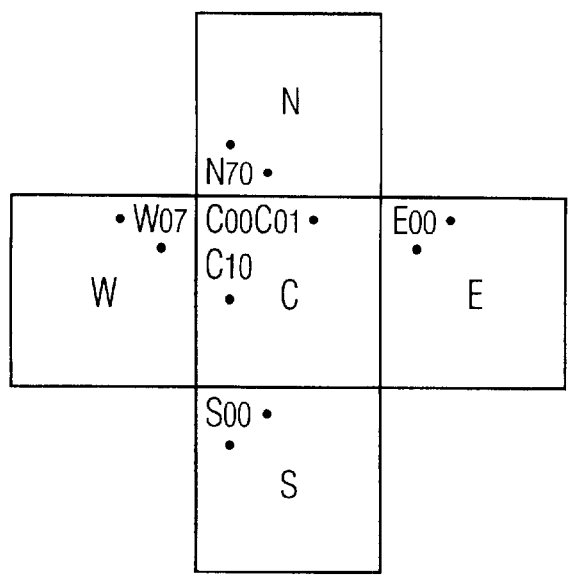
FIGS. 4A–C illustrate exemplary spatial weights.

FIG. 3B generally illustrates the overall steps of these prediction methods for a particular pixel block. Accordingly LF coefficient prediction begins, preferably, at step 27 with input of the DC coefficients of a block and of its adjacent blocks. FIG. 4A illustrates central pixel block C together with the four, orthogonally-adjacent pixel blocks sharing edges with central block C that are considered in a preferred embodiment of this invention. These blocks are labeled W (to the west of C), N (to the north of C), E (to the east of C), and S (to the south of C). Diagonally adjacent pixel blocks are not directly considered in this embodiment. In the following, pixels in any pixel block are denoted in standard matrix notation. In particular, FIG. 4A illustrates pixels $C_{00}$, $C_{01}$, and $C_{10}$ in northwest corner of central block C, pixel $N_{70}$ in the southwest corner of block N, pixel $E_{00}$ in the northwest corner of block E, pixel $W_{07}$ in the northeast corner of block W, and pixel $S_{00}$ in the northwest corner of block S. Also DC coefficients (zero-frequency coefficients, or average intensities) for these pixel blocks are denoted symbols $C_{DC}$, $N_{DC}$, $E_{DC}$, $W_{DC}$, and $S_{DC}$.

With reference again to FIG. 3B, at step 28, from these DC coefficients four quantities, denoted by N, E, W, and S and approximating the block-to-block differences between central block C and its adjacent blocks N, E, W, and S, respectively, are determined. The following equations are representative of a preferred embodiment of this approximation.

$$N = FA * \{N_{DC} - C_{DC}\}; \quad E = FA * \{E_{DC} - C_{DC}\}$$

$$W = FA * \{W_{DC} - C_{DC}\}; \quad S = FA * \{S_{DC} - C_{DC}\}$$

Factor FA is a multiplicative weighting factor for scaling the approximate block-to-block differences. It is described subsequently in more detail in conjunction with second multiplicative weighting factor FB. This invention is adaptable to alternative equations for determining these four approximate block-to-block differences. Alternative equations can depend on only the five DC coefficients utilized above, or can alternatively depend on additional DC coefficients from, e.g., diagonally adjacent blocks or more remotely adjacent blocks.

Next, at step 29 the interpolating pixel array is determined from the approximated block-to-block differences. This interpolating pixel array is designed to achieve a smooth interpolation of the block-to-block differences to pixel values within the central pixel block that are likely to occur in the presence of such block-to-block differences. It is noted that the actual pixel values expected are the sum of values in the interpolated pixel array with the DC coefficient of that block.

It has been found advantageous if this interpolation satisfy certain heuristic constraints. A first heuristic constraint is that the sum of the pixel values in the interpolating pixel array be zero in order that the average intensity of the pixel block does not change. A second heuristic constraint is that the magnitude of the effect on pixel values of a difference at a boundary decreases away from that boundary. In particular, the maximum pixel value due to a boundary difference should occur adjacent to that boundary and should also be less than or equal to that boundary difference. A third heuristic constraint is that a difference at one boundary of a pixel block coupled with another equal but oppositely signed difference at the opposite boundary (along either a row or column) should interpolate to a uniform pixel-value gradient between the two boundaries.

This invention is adaptable generally to methods for determining the interpolating pixel array that satisfy the above heuristic constraints. In a preferred embodiment, this interpolating pixel array is determined by a linear interpolation of the block-to-block differences done in a dimension-independent manner. A dimension-independent interpolation is taken to mean that each pixel array element has independent, multiplicatively weighted contributions from each approximated block-to-block boundary difference, and each approximated block-to-block boundary difference contributes independently only to matrix elements in the row or column perpendicular that particular boundary. For example, a value approximating block-to-block difference between central block C and its western adjacent block W is interpolated along the rows of the interpolating pixel array. The same weights are preferably applicable to differences along each of the four pixel block boundaries. Further, the weights preferably depend only on the distance from the boundary.

The size of the interpolating pixel array need not be the same as size of pixel block manipulated in the encoder/decoder. Because it is the transform coefficients of the interpolating pixel array are of importance, the interpolating pixel array can be of any actual size such that its transform coefficients bear a definite relationship to the LF transform coefficients of the pixel block that are to be estimated. In fact, for computational efficiency, the size of interpolating pixel array can be advantageously chosen to be less than that of the encoder/decoder pixel block. In the preferred embodiment where 8×8 pixel blocks are transformed by discrete cosine transforms ("DCT") in the encoder/decoder pair, a preferred size for the interpolating pixel array is 4×4 (i.e., a square array four pixels on a side). Alternatively, an 8×8-sized interpolating pixel array can also be used.

Figure 4B:
Figure 4C:
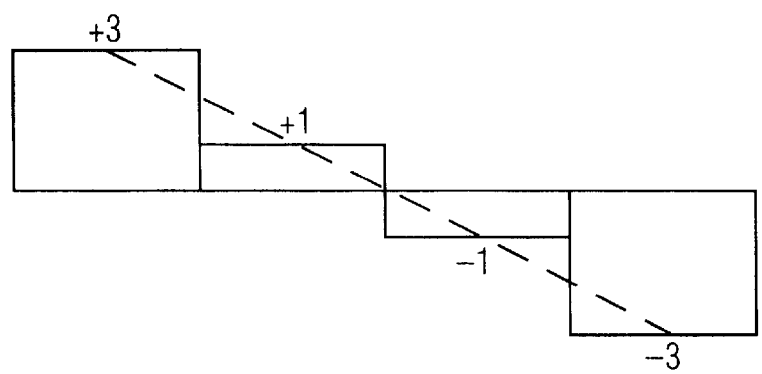

The multiplicative weights for interpolating the block-to-block differences are chosen according to satisfy the heuristic constraints above. In the preferred case of a 4×4-sized interpolating pixel array, FIG. 4B illustrates preferred multiplicative weights for interpolating from the left boundary. For interpolating from the right boundary, these weights are used in the reverse order. These weights satisfy the above constraints in that, first, they sum to zero and have a maximum weight adjacent to the boundary. Since, as FIG. 4C illustrates, the combination of a positive left unit boundary difference with a negative right unit boundary difference is a linear gradient between the two boundaries. the third constraint is also satisfied.

The following equations are exemplary of this preferred embodiment for defining the 4×4 interpolating pixel array. The multiplicative factor FB is chosen as an overall scaling factor for the interpolating pixel array.

$$array[0][0] = FB * \{3*N + 3*W\}$$

$$array[0][1] = FB * \{3*N - W - 2*E\}$$

$$array[0][2] = FB * \{3*N - 2*W - E\}$$

$$array[0][3] = FB * \{3*N + 3*E\}$$

-continued $$array[1][0] = FB * \{-N - 2*S + 3*W\}$$
$$array[1][1] = FB * \{-N - 2*S - W - 2*E\}$$
$$array[1][2] = FB * \{-N - 2*S - 2*W - E\}$$
$$array[1][3] = FB * \{-N - 2*S + 3*E\}$$
$$array[2][0] = FB * \{-2*N - S + 3*W\}$$
$$array[2][1] = FB * \{-2*N - S - W - 2*E\}$$
$$array[2][2] = FB * \{-2*N - S - 2*W - E\}$$
$$array[2][3] = FB * \{-2*N - S + 3*E\}$$
$$array[3][0] = FB * \{+3*S + 3*W\}$$
$$array[3][1] = FB * \{+3*S - W - 2*E\}$$
$$array[3][2] = FB * \{+3*S - 2*W - E\}$$
$$array[3][3] = FB * \{+3*S + 3*E\}$$

The multiplicative factors FA, applied to the block-to-block pixel difference, and FB, applied to interpolating pixel array, are selected so that the overall multiplicative factor, FA*FB, meets certain constraints in order to result in predicted LF coefficient leading to maximum image data stream compression. According a first constraint, the overall factor, FA*FB, is preferably less then or equal 0.500 so that, at boundaries between adjacent pixel blocks, the pixel values are not over smoothed, that is so that the pixel values at pixel blocks boundaries have reduced block-to-block differences but with the same sign as the original block-to-block differences. According to a related second constraint, the overall factor is more preferably less than 0.500 because, in the presence of pixel-value gradients, a certain block-to-block edge difference can be an actual image feature and should not be entirely eliminated. There is an additional factor in the overall weighting factor present to normalize the maximum of the spatial configuration weights to 1.00 (if it is not chosen initially to be 1.00).

In the preferred embodiment, FA is conventionally taken to be 1.0, so that the block-to-block differences directly represent unscaled pixel values. FB is advantageously taken as 0.375*(1.0/3.0). The factor (1.0/3.0) is necessary to normalize the preferred interpolation weights. The factor 0.375 has been found to provide good data stream compression, while being economical to compute by shifts and additions without multiplications.

The alternative of an 8×8-sized interpolating pixel array is entirely analogous to the above preferred 4×4-sized interpolating pixel array. Preferred multiplicative weights for the dimension-independent linear interpolation of a block-to-block difference from left boundary are the wight values: +4, +2, 0, −1, −2, −2, −1, and 0. The weights are used in the reverse order for interpolating a block-to-block edge difference from the right boundary. Interpolating equations are constructed from these weights in a dimension-independent manner entirely analogously to the equations for the preferred 4×4-sized interpolating pixel array. Preferred weights are FA=1.0 and FB=0.375*(1.0/4.0) (the factor (1.0/4.0) for normalized the preferred interpolating weights).

With reference again to FIG. 3B, having determined the interpolating pixel array, at step 30 this array is transformed to the relevant transform, or frequency, domain by the transform method otherwise utilized in the encoder/decoder pair, for example in elements 9 and 14 of FIG. 1. Alternatively, a closely related but computationally less-demanding transform method may be used that returns values approximating the relevant transform method. Where the interpolating pixel array is of a size smaller than the size of the pixel block, the size of the interpolating array is advantageously chosen so that its transform coefficients have a simple relation to the corresponding LF coefficients of the pixel block, for example, by being equal to the corresponding transform coefficients.

In the case of the preferred embodiment, the 4×4-sized interpolating pixel array is transformed by a DCT to yield transform coefficients that equal the corresponding LF coefficients of the pixel block. In the alternative embodiment of an 8×8-sized interpolating array, this array is also subject to a DCT yielding coefficients equaling the corresponding pixel block transform coefficients. Alternatively, but less preferably, a computationally less demanding Hadamard transform may replace the DCT.

Next, at step 31, predicted LF coefficients are selected from among the transform coefficients of the transformed interpolating pixel array. First, the DC coefficient is ignored. It is zero in case the interpolation method satisfies the first heuristic constraint, as is preferable. Second, it has been found that, since not all transform coefficients yield useful predictions of the corresponding LF coefficients of a pixel block, it is preferred to select the lowest frequency transform coefficients of the interpolating pixel array as predictors of the corresponding LF coefficients.

For example, in the case of either the 4×4-sized or the 8×8-sized interpolating array, one useful selection is to choose the upper lefthand 3×3 sub-matrix of transform coefficients (ignoring the DC coefficient). Thus the eight transform coefficients $T_{10}$, $T_{20}$, $T_{01}$, $T_{11}$, $T_{21}$, $T_{02}$, $T_{12}$, and $T_{22}$ (where T denotes the array of transform coefficients of the interpolating pixel array), are used as predictors of the corresponding LF transform coordinates. In an alternative selection, the upper triangular section of either the 4×4-sized or the 8×8-sized transform array is used. In this case, the nine transform coefficients $T_{10}$, $T_{20}$, $T_{30}$, $T_{01}$, $T_{11}$, $T_{21}$, $T_{02}$, $T_{12}$, and $T_{03}$ are used as predictors of the corresponding LF transform coordinates.

Alternatively steps 29, 30, and 31 can be combined into a single step in which the selected LF transform coefficients of the interpolating pixel array are directly determined as a linear combination of differences of the DC coefficient of the pixel block and the DC coefficients of the orthogonally adjacent pixel blocks. The linear interpolation of the DC coefficient differences can be composed with the linear transformation process to yield the selected LF coefficients as a single linear combination of the DC coefficient differences. As one of skill in the art will appreciate, it is a routine matter to compose these two sets of linear equation by a matrix multiplication in order to determine a single set of linear equations representing the LF coefficients in terms of the DC coefficient differences.

Finally, at step 32 the selected LF transform coefficients of the interpolating pixel array are output to the subsequent steps and/or elements of the methods and systems of the present invention as predictors of the corresponding LF transform coefficients.

The embodiments discussed above require no changes in the data streams recognized by typical encoder/decoder pairs in order to utilize the improvement of this invention. As mentioned above, in less preferred alternatives, these data streams can be augmented to include additional items in order to permit better approximation of block-to-block differences and, thus, better prediction of LF transform coefficients.

In one such alternative, actual averages of pixel values along each of the four edges of a block can be provided in a modified data stream. Such additional averages are directly informative of actual differences between edge pixel values of adjacent blocks. In another alternative, in addition to only four quantities, one for each edge of a central block, which necessarily represent only average differences along an entire edge, variations in block-to-block pixel differences along each edge of the central block can be provided in a modified data stream. This alternative method represents variations in intensity by providing more than one quantity for each edge, each quantity representing the differences in one or more pairs of edge-adjacent pixels of central block C. In a case where averages of the differences of two adjacent pairs of pixels are computed, the following equations are representative of this alternative.

$$A = 0.250 * FA * \{(W_{17} - C_{10}) + (W_{07} - C_{00}) + (N_{70} - C_{00}) + (N_{71} - C_{01})\}$$

$$B = 0.500 * FA * \{(N_{72} - C_{02}) + (N_{73} - C_{03})\}$$

$$C = 0.500 * FA * \{(N_{74} - C_{04}) + (N_{75} - C_{05})\}$$

$$D = 0.250 * FA * \{(N_{76} - C_{06}) + (N_{77} - C_{07}) + (E_{00} - C_{07}) + (E_{01} - C_{17})\}$$

$$E = 0.500 * FA * \{(E_{20} - C_{27}) + (E_{30} - C_{37})\}$$

$$F = 0.500 * FA * \{(E_{40} - C_{47}) + (E_{50} - C_{57})\}$$

$$G = 0.250 * FA * \{(E_{60} - C_{67}) + (E_{70} - C_{77}) + (S_{07} - C_{77}) + (S_{06} - C_{76})\}$$

$$H = 0.500 * FA * \{(S_{05} - C_{75}) + (S_{04} - C_{74})\}$$

$$I = 0.500 * FA * \{(S_{03} - C_{73}) + (S_{02} - C_{72})\}$$

$$J = 0.250 * FA * \{(S_{01} - C_{71}) + (S_{00} - C_{70}) + (W_{77} - C_{70}) + (W_{67} - C_{60})\}$$

$$K = 0.500 * FA * \{(W_{57} - C_{50}) + (W_{47} - C_{40})\}$$

$$L = 0.500 * FA * \{(W_{37} - C_{30}) + (W_{27} - C_{20})\}$$

A coarser representation could be used by combining certain of the above quantities. For example, the following combined and coarser quantities can be used.

$$B'=C'=0.500*(B+C); \quad E'=F'=0.500*(E+F)$$
$$I'=H'=0.500*(I+H); \quad L'=K'=0.500*(L+K)$$

Other similar alternatives of increased or decreased coarseness will be apparent to one of skill in the art.

These additional block-to-block difference items can be interpolated to form a 4×4-sized, or an 8×8-sized, interpolating pixel array in a dimension-independent manner by equations entirely analogous to those presented and described above. Where such additional items are provided, it can be advantageous to select additional coefficients from the transform of the interpolating pixel array. For example, in the case of 4×4-sized interpolating arrays, all transform coefficients, except for the DC coefficient, can be selected. In the case of 8×8-sized arrays, the upper left 4×4 or 5×5 sub-arrays, except for the DC coefficient, of the transform of the interpolating pixel array can be selected.

The equations presented above are exemplary of embodiments of the methods described. One of skill in the art will understand how their form could be improved for computational efficiency in micro-processors and digital signal processors of various architectures. For example, the total number of arithmetic operations can be reduced by factorization in view of the dimension independence of the 4×4-sized and 8×8-sized interpolating pixel arrays. Further, multiplicative operations, including the overall multiplicative weight factor, can be implemented by less costly shifts and additions, instead of more costly multiplications.

Additionally, the particular combination of alternatives chosen from those described above can be dictated by a tradeoff of the processing power available in a proposed system against with the degree of improved data stream compression sought. In particular, it will be apparent that, for various classes of images and particular compression methods, the parameters of the methods and system of this invention can be optimized by routine methods to give maximum improved data stream compression.

It should now be appreciated that the objects of the present invention are satisfied. While the present invention has been described in particular detail, it should also be appreciated that numerous modifications are possible and will be apparent to one of skill in the art. These modifications are intended to be within the spirit and scope of the invention as claimed.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method for compressing an image presented as image data in the form of a pixel array comprising:

transforming a plurality of pixel blocks to transform coefficients in a frequency domain, wherein the pixel blocks are rectangular, non-overlapping, and the plurality of pixel blocks covers the pixel array, and wherein the transform coefficients represent each pixel block and include a zero frequency transform coefficient, one or more selected low frequency transform coefficients, and remaining transform coefficients, predicting for each pixel block the selected low frequency transform coefficients from a linear combination of the zero frequency transform coefficient of the pixel block and of the zero frequency transform coefficients of pixel blocks orthogonally adjacent to the pixel block, subtracting for each pixel block the predicted selected low frequency transform coefficients from the selected low frequency transform coefficients to form difference transform coefficients, quantizing for each pixel block the difference coefficients and the remaining transform coefficients, and representing the image by compressed image data comprising the zero frequency transform coefficient, the quantized difference coefficients, and the quantized remaining coefficients for each of the plurality of pixel blocks;

wherein said step of predicting for each pixel block further comprises:

determining an interpolating pixel array having interpolating pixel values linearly interpolating differences between the zero frequency transform coefficient of the pixel block and the zero frequency transform coefficients of pixel blocks orthogonally adjacent to the pixel block, transforming the interpolating pixel array to transform coefficients in the frequency domain, and selecting the predicted selected low frequency transform coefficients as the corresponding transform coefficients of the interpolating pixel array;

wherein said step of selecting selects the predicted selected low frequency transform coefficients as those transform coefficients present in an upper left square sub-array of size three-by-three of the transformed interpolating pixel array, excluding the zero frequency transform coefficient of the transformed interpolating pixel array.

2. A method for compressing an image presented as image data in the form of a pixel array comprising:

transforming a plurality of pixel blocks to transform coefficients in a frequency domain, wherein the pixel blocks are rectangular, non-overlapping, and the plurality of pixel blocks covers the pixel array, and wherein the transform coefficients represent each pixel block and include a zero frequency transform coefficient, one or more selected low frequency transform coefficients, and remaining transform coefficients, predicting for each pixel block the selected low frequency transform coefficients from a linear combination of the zero frequency transform coefficient of the pixel block and of the zero frequency transform coefficients of pixel blocks orthogonally adjacent to the pixel block, subtracting for each pixel block the predicted selected low frequency transform coefficients from the selected low frequency transform coefficients to form difference transform coefficients, quantizing for each pixel block the difference coefficients and the remaining transform coefficients, and representing the image by compressed image data comprising the zero frequency transform coefficient, the quantized difference coefficients, and the quantized remaining coefficients for each of the plurality of pixel blocks;

wherein said step of predicting for each pixel block further comprises:

determining an interpolating pixel array having interpolating pixel values linearly interpolating differences between the zero frequency transform coefficient of the pixel block and the zero frequency transform coefficients of pixel blocks orthogonally adjacent to the pixel block, transforming the interpolating pixel array to transform coefficients in the frequency domain, and selecting the predicted selected low frequency transform coefficients as the corresponding transform coefficients of the interpolating pixel array;

wherein the pixel values of the interpolating pixel array are weighted sums of differences between the zero frequency transform coefficient of the pixel block and the zero frequency transform coefficient of each pixel block orthogonally adjacent to the pixel block, and wherein the pixel values are linearly interpolated in a dimension-independent manner;

wherein the interpolating pixel array is a square array, and wherein the weights of the weighted sum are chosen such that a first zero frequency transform coefficient difference at one boundary of the pixel block and a second zero frequency transform coefficient difference at the opposite boundary that is of equal magnitude and opposite sign to the first zero frequency transform coefficient difference results in a linear gradient of interpolating pixel values between the boundaries in the interpolating pixel array.

3. The method of claim 2 wherein the interpolating pixel array is four pixels on a side, and wherein the weights are +3, −1, −2, and 0.

4. The method of claim 2 wherein the interpolating pixel array is array eight pixels on a side, and wherein the weights are +4, +2, 0, −1, −2, −2, −1, and 0.

* * * * *